US012559603B2

(12) United States Patent
Kiriyama et al.

(10) Patent No.: US 12,559,603 B2
(45) Date of Patent: Feb. 24, 2026

(54) POLYURETHANE FOAM, MOLDED BODY OF SAME AND METHOD FOR PRODUCING MOLDED BODY

(71) Applicants: INOAC CORPORATION, Nagoya (JP); ROGERS INOAC CORPORATION, Nagoya (JP)

(72) Inventors: Takuya Kiriyama, Aichi (JP); Kento Uchida, Aichi (JP)

(73) Assignees: INOAC CORPORATION, Aichi (JP); ROGERS INOAC CORPORATION, Aichi (JP)

( * ) Notice: Subject to any disclaimer, the term of this patent is extended or adjusted under 35 U.S.C. 154(b) by 714 days.

(21) Appl. No.: 17/767,439

(22) PCT Filed: Oct. 9, 2020

(86) PCT No.: PCT/JP2020/038354
§ 371 (c)(1),
(2) Date: Apr. 8, 2022

(87) PCT Pub. No.: WO2021/070949
PCT Pub. Date: Apr. 15, 2021

(65) Prior Publication Data
US 2024/0067791 A1 Feb. 29, 2024

(30) Foreign Application Priority Data

Oct. 10, 2019 (JP) ................................. 2019-186657
May 29, 2020 (JP) ................................. 2020-094119
Oct. 9, 2020 (JP) ................................. 2020-171088

(51) Int. Cl.
*C08J 9/36* (2006.01)
*C08G 18/08* (2006.01)
(Continued)

(52) U.S. Cl.
CPC ............ *C08J 9/36* (2013.01); *C08G 18/0838* (2013.01); *C08G 18/4081* (2013.01);
(Continued)

(58) Field of Classification Search
CPC .... C08J 9/30; C08J 2201/022; C08J 2375/04; C08J 9/36; C08J 2375/08; C08J 2423/30;
(Continued)

(56) References Cited

U.S. PATENT DOCUMENTS 4,785,026 A * 11/1988 Yeakey .............. C08G 18/4081
521/137
5,196,476 A * 3/1993 Simroth ................ C08F 283/06
524/769
(Continued)

FOREIGN PATENT DOCUMENTS

CN 105209544 A 12/2015
JP S61-245384 A 10/1986
(Continued)

OTHER PUBLICATIONS

JP2005227392A Machine Translation (Year: 2005).*
(Continued)

*Primary Examiner* — Christina H. W. Rosebach
(74) *Attorney, Agent, or Firm* — SOLARIS Intellectual Property Group, PLLC

(57) ABSTRACT

A polyurethane foam which is obtained from an inert gas and a polyurethane reaction composition containing a polyol component, a foam stabilizer, a catalyst and an isocyanate component, by a mechanical froth method, wherein: the polyol component contains a polymer polyol having a solid
(Continued)

content of from 20% by weight to 43% by weight; and the polyurethane reaction composition contains an acid-modified polyolefin powder.

7 Claims, 4 Drawing Sheets

(51) Int. Cl.

| | |
|---|---|
| *C08G 18/40* | (2006.01) |
| *C08G 18/76* | (2006.01) |
| *C08G 18/82* | (2006.01) |
| *C08J 9/30* | (2006.01) |
| *C08G 101/00* | (2006.01) |

(52) U.S. Cl.
CPC ......... *C08G 18/7692* (2013.01); *C08G 18/82* (2013.01); *C08J 9/30* (2013.01); *C08G 2101/00* (2013.01); *C08J 2201/022* (2013.01); *C08J 2375/08* (2013.01); *C08J 2423/30* (2013.01)

(58) Field of Classification Search
CPC ............ C08G 18/0838; C08G 18/7692; C08G 18/82; C08G 2101/00; C08G 18/0383; C08G 18/4081
See application file for complete search history.

(56)     References Cited

U.S. PATENT DOCUMENTS

| | | | | |
|---|---|---|---|---|
| 5,519,068 | A | | 5/1996 | Okada et al. |
| 2015/0376324 | A1* | 12/2015 | Bang ................. C08G 18/0828 |
| | | | | 521/121 |

FOREIGN PATENT DOCUMENTS

| | | | | | | |
|---|---|---|---|---|---|---|
| JP | H07-10953 | A | | 1/1995 | | |
| JP | 2000-95039 | A | | 4/2000 | | |
| JP | 2002-37828 | A | | 2/2002 | | |
| JP | 2002-37837 | A | | 2/2002 | | |
| JP | 2005227392 | A | * | 8/2005 | ......... | C08G 18/4837 |
| JP | 2009-013304 | A | | 1/2009 | | |
| JP | 2010-235903 | A | | 10/2010 | | |
| JP | 2012-82273 | A | | 4/2012 | | |
| JP | 2016-500127 | A | | 1/2016 | | |
| JP | 2019026776 | A | * | 2/2019 | | |
| JP | 2020-33494 | A | | 3/2020 | | |
| WO | WO-2014200452 | A2 | * | 12/2014 | ......... | C08G 18/3206 |

OTHER PUBLICATIONS

JP2019026776A Machine Translation (Year: 2019).*
Merriam-Webster Dictionary Definition, Powder (Year: 2024).*
Machine translation of CN 102464880 by Guo (Year: 2012).*
Machine translation of CN 1312302 by Gu et al. (Year: 2001).*

* cited by examiner 107     101     10     103

2     2

102     104     106

(2-2 Cross Section)

| Item | Unit | Comparative Example 1 | Comparative Example 2 | Comparative Example 3 | Comparative Example 4 | Comparative Example 5 | Comparative Example 6 | Comparative Example 7 | Example 1 | Example 2 | Example 3 | Example 4 | Example 5 | Example 6 | Example 7 |
|---|---|---|---|---|---|---|---|---|---|---|---|---|---|---|---|
| Cross-linking agent | Parts by weight | 15.1 | 0 | 0 | 5 | 0 | 15.1 | 15.1 | 8.1 | 8.1 | 8.1 | 8.1 | 8.1 | 8.1 | 8.1 |
| Polyol A | Parts by weight | 10.8 | 50.5 | 9 | 0 | 50.5 | 10.8 | 10.8 | 10.8 | 10.8 | 10.8 | 10.8 | 10.8 | 10.8 | 10.8 |
| Polyol 1 (PP-3000) | Parts by weight | 0 | 16.8 | 35 | 38.7 | 16.8 | 0 | 0 | 42 | 27 | 7 | 17 | 37 | 44 | 7 |
| Polyol 2 (POP) | Parts by weight | 8.4 | 0 | 4 | 2.7 | 0 | 8.4 | 8.4 | 0 | 0 | 0 | 0 | 0 | 0 | 0 |
| Polyol 3 (POP) | Parts by weight | 9.1 | 0 | 27.5 | 0 | 0 | 9.1 | 9.1 | 0 | 0 | 0 | 0 | 0 | 0 | 0 |
| Polyol 4 (POP) | Parts by weight | 36.6 | 0 | 0 | 19 | 0 | 36.5 | 36.6 | 5 | 20 | 40 | 30 | 10 | 10 | 40 |
| Polyol 5 (POP) | Parts by weight | 0 | 0 | 0 | 0 | 0 | 0 | 0 | 0 | 0 | 0 | 0 | 0 | 0 | 0 |
| Cross-linking agent + polyol total | Parts by weight | 80 | 67.3 | 75.5 | 65.4 | 67.3 | 80 | 80 | 65.9 | 65.9 | 65.9 | 65.9 | 65.9 | 72.9 | 65.9 |
| Sub-total of polymer polyol (POP) | Parts by weight | 54.1 | 0 | 31.5 | 21.7 | 0 | 54.1 | 54.1 | 5 | 20 | 40 | 30 | 10 | 10 | 40 |
|  | wt% | 36.0 | 0.0 | 24.8 | 18.9 | 0.0 | 36.0 | 36.0 | 3.3 | 13.2 | 26.6 | 19.8 | 6.6 | 6.3 | 26.6 |
| Solid content ratio of polymer polyol (POP) | wt% | 13.0 | 0.0 | 5.0 | 7.7 | 0.0 | 13.0 | 13.0 | 1.4 | 5.7 | 11.4 | 8.5 | 2.8 | 2.7 | 11.4 |
| Type of thermoplastic resin powder |  | Ordinary PE | None | None | None | Ordinary PE | Polyamide | Polyester | Acid-modified PE | Acid-modified PE | Acid-modified PE | Acid-modified PE | Acid-modified PE | Acid-modified PE | Acid-modified PP |
| Addition amount of thermoplastic resin powder | Parts by weight | 20 | 0 | 0 | 0 | 40 | 20 | 20 | 5 | 5 | 10 | 30 | 40 | 50 | 10 |
|  | wt% | 13.3 | 0.0 | 0.0 | 0.0 | 27.2 | 13.3 | 13.3 | 3.3 | 3.3 | 6.6 | 19.8 | 26.2 | 31.3 | 6.6 |
| Total resin ratio (thermoplastic resin powder + POP solid content) | wt% | 26.3 | 0.0 | 5.0 | 7.7 | 27.2 | 26.3 | 26.3 | 4.7 | 9.0 | 18.0 | 28.3 | 29.0 | 34.0 | 18.0 |
| Silicon foam stabilizer | Parts by weight | 2.7 | 2.7 | 2.7 | 2.7 | 2.7 | 2.7 | 2.7 | 2.7 | 2.7 | 2.7 | 2.7 | 2.7 | 2.7 | 2.7 |
| Iron catalyst | Parts by weight | 5 | 5 | 5 | 5 | 5 | 5 | 5 | 5 | 5 | 5 | 5 | 5 | 5 | 5 |
| Alumina trihydrate | Parts by weight | 0.8 | 20 | 33 | 23 | 0 | 0.8 | 0.8 | 45 | 45 | 40 | 20 | 10 | 0 | 40 |
| Isocyanate (MDI) | Parts by weight | 41.7 | 31.9 | 10.9 | 18.5 | 31.9 | 41.7 | 41.7 | 29.3 | 28.3 | 27.0 | 27.7 | 29.0 | 29.0 | 27.0 |
| Reaction composition total | Parts by weight | 150.2 | 126.9 | 127.1 | 114.6 | 146.9 | 150.2 | 150.2 | 152.9 | 151.9 | 150.6 | 151.3 | 152.6 | 159.6 | 150.6 |
| Foamed state |  | × (Bubble rupture) | ○ | ○ | ○ | ○ | ○ | ○ | ○ | ○ | ○ | ○ | ○ | ○ | ○ |
| Initial moldability | % | ※ | 10.6 | 20.5 | 35.1 | 28.2 | 31.8 | 30.4 | 63.5 | 97.9 | 95.4 | 97.0 | 97.1 | 97.7 | 94.2 |
| Evaluation |  | ※ | × | × | × | × | × | × | △ | ◎ | ◎ | ◎ | ◎ | ◎ | ◎ |
| Mold retention, ambient temperature × 24h | % | ※ | 90.5 | 93.5 | 91.7 | 82.5 | 78.8 | 78.2 | 71 | 91.3 | 92.2 | 96.8 | 98.1 | 98.8 | 91.5 |
| Evaluation |  | ※ | ◎ | ◎ | ◎ | ◎ | ○ | ○ | ○ | ◎ | ◎ | ◎ | ◎ | ◎ | ◎ |
| Mold retention, ambient temperature × 1 week | % | ※ | 66.7 | 41.9 | 64.3 | 38.6 | 69.5 | 69.4 | 60.3 | 84.8 | 88.5 | 95.2 | 97.2 | 97.9 | 87.2 |
| Evaluation |  | ※ | △ | × | △ | × | △ | △ | △ | ○ | ○ | ◎ | ◎ | ◎ | ○ |
| 25%CLD [MPa] |  | ※ | 0.015 | 0.050 | 0.053 | 0.028 | 0.103 | 0.048 | 0.691 | 0.715 | 1.073 | 0.669 | 0.550 | 0.405 | 1.082 |
| Residual compression strain | % | ※ | 2.8 | 2.7 | 2.5 | 2.1 | 37.5 | 18.8 | 3.7 | 3.3 | 3.7 | 3.1 | 3.6 | 4.6 | 3.8 |
| Evaluation |  | × | ◎ | ◎ | ◎ | ◎ | × | × | △ | ◎ | ◎ | ◎ | ◎ | ◎ | ◎ |
| Overall evaluation |  | × | × | × | × | × | × | × | ○ | ○ | ○ | ○ | ○ | ○ | ○ |

※Data not measured owing to foaming: × (cell rupture)

FIG.4

| | Unit | Example 8 | Example 9 | Example 10 | Example 11 | Example 12 |
|---|---|---|---|---|---|---|
| Cross-linking agent | Parts by weight | 8.1 | 8.1 | 8.1 | 8.1 | 8.1 |
| Polyol A | Parts by weight | 10.8 | 10.8 | 10.8 | 10.8 | 10.8 |
| Polyol 1 (PP-3000) | Parts by weight | 17 | 7 | 17 | 7 | 17 |
| Polyol 2 (POP) | Parts by weight | 0 | 0 | 0 | 0 | 0 |
| Polyol 3 (POP) | Parts by weight | 30 | 40 | 30 | 40 | 0 |
| Polyol 4 (POP) | Parts by weight | 0 | 0 | 0 | 0 | 0 |
| Polyol 5 (POP) | Parts by weight | 0 | 0 | 0 | 0 | 30 |
| Cross-linking agent + polyol total | Parts by weight | 65.9 | 65.9 | 65.9 | 65.9 | 65.9 |
| Sub-total of | Parts by weight | 30 | 40 | 30 | 40 | 30 |
| polymer polyol (POP) | wt% | 19.8 | 26.6 | 18.6 | 24.9 | 19.8 |
| Solid content ratio of polymer polyol (POP) | wt% | 4.0 | 5.3 | 3.7 | 5.0 | 7.9 |
| Type of thermoplastic resin powder | | Acid-modified PE | Acid-modified PE | Acid-modified PE | Acid-modified PE | Acid-modified PE |
| Addition amount of | Parts by weight | 30 | 30 | 40 | 40 | 30 |
| thermoplastic resin powder | wt% | 19.8 | 19.9 | 24.8 | 24.9 | 19.8 |
| Total resin ratio (thermoplastic resin powder + POP solid content) | wt% | 23.8 | 25.2 | 28.5 | 29.9 | 27.7 |
| Silicon foam stabilizer | Parts by weight | 2.7 | 2.7 | 2.7 | 2.7 | 2.7 |
| Iron catalyst | Parts by weight | 5 | 5 | 5 | 5 | 5 |
| Alumina trihydrate | Parts by weight | 20 | 20 | 20 | 20 | 20 |
| Isocyanate (MDI) | Parts by weight | 27.6 | 26.9 | 27.6 | 26.9 | 27.9 |
| Reaction composition total | Parts by weight | 151.2 | 150.5 | 161.2 | 160.5 | 151.5 |
| Foamed state | | ◎ | ◎ | ◎ | ◎ | ◎ |
| Initial moldability | % | 89.8 | 89.6 | 96.2 | 90.2 | 97.6 |
| | Evaluation | ○ | ○ | ◎ | ◎ | ◎ |
| Mold retention, ambient | % | 75.4 | 81.2 | 90.1 | 87.5 | 91.5 |
| temperature × 24h | Evaluation | ○ | ○ | ◎ | ○ | ◎ |
| Mold retention, ambient | % | 73.6 | 80.8 | 88.9 | 86.1 | 82.6 |
| temperature × 1 week | Evaluation | ○ | ○ | ○ | ○ | ○ |
| 25%CLD[MPa] | | 0.187 | 0.212 | 0.183 | 0.240 | 0.139 |
| Residual compression | % | 4.8 | 4.5 | 5.5 | 3.3 | 5.7 |
| strain | Evaluation | ◎ | ◎ | ○ | ◎ | ○ |
| Overall evaluation | | ○ | ○ | ○ | ○ | ○ |

FIG.5

| | Example | | | Comparative Example | Comparative Example | Example | | | | | Comparative Example | Example | | | | |
|---|---|---|---|---|---|---|---|---|---|---|---|---|---|---|---|---|
| | 4-1 | 4-2 | 4-3 | 4-1 | 4-2 | 4-4 | 4-5 | 4-6 | 4-7 | 4-8 | 4-3 | 4-9 | 4-10 | 4-11 | 4-12 | 4-13 |
| Pre-heating temperature (°C) | 190 | 200 | 210 | 220 | 150 | 160 | 170 | 180 | 190 | 200 | 150 | 160 | 170 | 180 | 190 | 200 |
| Time (min) | 3 | 3 | 3 | 3 | 4 | 4 | 4 | 4 | 4 | 4 | 5 | 5 | 5 | 5 | 5 | 5 |
| Surface state | ◎ | ◎ | ◎ | × | ◎ | ◎ | ◎ | ◎ | ◎ | ◎ | ◎ | ◎ | ◎ | ◎ | ◎ | ◎ |
| Original thickness | 10.2 | 10.2 | 10.2 | 10.2 | 10.2 | 10.2 | 10.2 | 10.2 | 10.2 | 10.2 | 10.2 | 10.2 | 10.2 | 10.2 | 10.2 | 10.2 |
| Thickness immediately after molding [mm] | 5.2 | 5.1 | 5.0 | 5.0 | 5.5 | 5.3 | 5.2 | 5.1 | 5.1 | 5.0 | 5.4 | 5.2 | 5.0 | 5.0 | 5.0 | 5.0 |
| Mold retention immediately after molding [%] | 96 | 99 | 100 | 100 | 90 | 94 | 97 | 98 | 99 | 100 | 92 | 96 | 100 | 100 | 100 | 100 |
| Result | ◎ | ◎ | ◎ | ◎ | ◎ | ◎ | ◎ | ◎ | ◎ | ◎ | ◎ | ◎ | ◎ | ◎ | ◎ | ◎ |
| Thickness 1 day after molding [mm] | 5.9 | 5.6 | 5.4 | 5.3 | 6.9 | 6.2 | 5.9 | 5.8 | 5.6 | 5.4 | 6.7 | 5.9 | 5.8 | 5.6 | 5.5 | 5.3 |
| Mold retention 1 day after molding [%] | 82 | 88 | 93 | 95 | 63 | 77 | 83 | 85 | 89 | 93 | 68 | 83 | 85 | 89 | 90 | 95 |
| Result | ○ | ○ | ◎ | ◎ | △ | ○ | ○ | ○ | ○ | ◎ | △ | ○ | ○ | ○ | ◎ | ◎ |
| Thickness 1 week after molding [mm] | 6.1 | 5.7 | 5.4 | 5.3 | 7.0 | 6.3 | 6.0 | 5.8 | 5.7 | 5.4 | 6.7 | 5.9 | 5.8 | 5.6 | 5.5 | 5.3 |
| Mold retention 1 week after molding [%] | 80 | 87 | 93 | 94 | 61 | 75 | 80 | 84 | 87 | 93 | 67 | 82 | 85 | 88 | 90 | 94 |
| Result | ○ | ○ | ◎ | ◎ | △ | ○ | ○ | ○ | ○ | ◎ | △ | ○ | ○ | ○ | ◎ | ◎ |

1

POLYURETHANE FOAM, MOLDED BODY OF SAME AND METHOD FOR PRODUCING MOLDED BODY

TECHNICAL FIELD

The present invention relates to a polyurethane foam suitable for thermal compression molding, a molded body thereof, and a method for producing the molded body.

BACKGROUND ART

Thermoplastic resins can be shaped by heating, but have the problem of poor strain characteristics (large strain).

Further, a thermosetting resin can be shaped by pre-processing using a mold, and although post-processing is difficult, this has the advantage of favorable strain characteristics (reduced strain).

Further, although a conventional polyurethane foam can be subjected to thermal compression molding at a high temperature, there is the problem that the strain characteristics cannot be said to be favorable.

PRIOR ART DOCUMENTS

Patent Documents

Patent Document 1: Japanese Patent Application Laid-open No. 2009-013304

SUMMARY OF INVENTION

Technical Problem

The present invention has been made in view of the above-described matters, and an object of the present invention is to provide a polyurethane foam that can be subjected to thermal compression molding and has favorable strain characteristics, a molded body thereof, and a method for producing the molded body.

Solution to Problem

A polyurethane foam according to one aspect of the present invention that can solve the above problems is:

(1) a polyurethane foam that is obtained from an inert gas and a polyurethane reaction composition containing a polyol component, a foam stabilizer, a catalyst and an isocyanate component, by a mechanical froth method, the polyol component containing a polymer polyol having a solid content of from 20% by weight to 43% by weight, and the polyurethane reaction composition containing an acid-modified polyolefin powder.

(2) In the polyurethane foam of (1) above, the acid-modified polyolefin powder is preferably a polyolefin powder that has been modified by a maleic anhydride.

(3) In the polyurethane foam of (1) or (2) above, a proportion of a total weight of the solid content of the polymer polyol and the acid-modified polyolefin powder, relative to a weight of the polyurethane reaction composition, is preferably from 4% by weight to 40% by weight.

(4) In the polyurethane foam of any one of (1) to (3) above, a residual compression strain of the polyurethane foam based on JIS K6401:2011 is preferably 10% or lower.

(5) A molded body of a polyurethane foam according to one aspect of the present invention that can solve the above problems is, in a molded body including irregularities formed by thermal compression molding at a surface of a sheet of the polyurethane foam, a molded body in which the polyurethane foam is the polyurethane foam described in any one of (1) to (4) above.

(6) A method for producing a molded body according to one aspect of the present invention that can solve the above problems is a method for producing a molded body including irregularities formed by thermal compression molding at a surface of a sheet of a polyurethane foam, the method including: preheating a sheet comprising the polyurethane foam described in any one of (1) to (4) above at from 160 to 210° C.; subjecting the sheet after the preheating to thermal compression molding by compression pressing using an ambient-temperature die provided with irregularities at a mold face; and imparting the irregularities of the mold face to a surface of the sheet.

(7) In the method for producing a molded body of (6) above, a compression ratio of the sheet by the compression pressing is preferably from 25 to 75%.

Advantageous Effects of Invention

According to the polyurethane foam in the present invention, by including a polymer polyol having a solid content of from 20 to 43% by weight and an acid-modified polyolefin powder in the polyurethane reaction composition, the polyurethane foam can be thermoplastically deformed below the decomposition temperature of a polyurethane bond, and it becomes possible to maintain the shape at the time of thermal compression molding while improving the strain characteristics.

According to the molded body of the polyurethane foam in the present invention, a sheet-shaped molded product having favorable strain characteristics that can maintain surface irregularities shaped by thermal compression molding can be obtained.

According to the method for producing a molded body in the present invention, a sheet made from the polyurethane foam in the present invention is preheated at from 160 to 210° C., and the sheet after the preheating is subjected to thermal compression molding by compression pressing using an ambient-temperature die provided with irregularities at a mold face. As a result, a molded product having favorable strain characteristics can be obtained in which the surface irregularities of the sheet shaped by thermal compression molding can be maintained, the molded product having a favorable surface state with no surface burning or roughness, and having favorable mold retention (moldability).

BRIEF DESCRIPTION OF DRAWINGS

FIG. 3 is a table showing the formulation, mold retention, 25% CLD and residual compression strain values of some of the examples and of the comparative examples, and evaluation thereof.

FIG. 4 is a table showing the formulation, mold retention, 25% CLD and residual compression strain values and evaluations of the remaining examples.

FIG. 5 is a table showing examples and comparative examples in which the preheating temperature and the preheating time were changed.

DESCRIPTION OF EMBODIMENTS

Figures 1, 2:
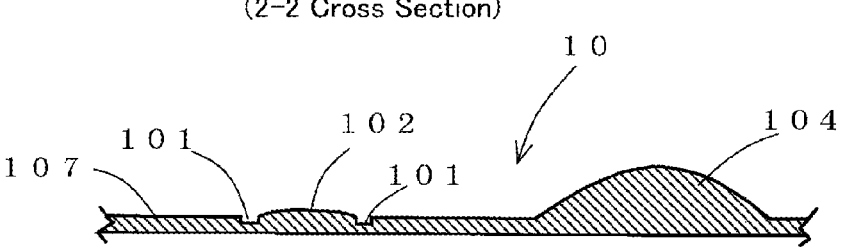
FIG. 1 is a plan view showing an embodiment of a molded body of a polyurethane foam.
FIG. 2 is a cross-sectional view showing a cross section along line 2-2 of FIG. 1.

An embodiment of the polyurethane foam in the present invention will be described. The polyurethane foam of the present embodiment is obtained from a polyurethane reaction composition and an inert gas by a mechanical froth method.

A mechanical froth method is a method of forming a polyurethane foam by supplying a mixed raw material, obtained by compressing and mixing the inert gas with the polyurethane reaction composition, to an Oakes mixer or a nozzle with a pinched tip, and discharging it from the Oakes mixer or the nozzle. In the mechanical froth method, when the mixed raw material is discharged, the hitherto compressed inert gas expands and forms bubbles, and in this state, a polyol component and an isocyanate component react and are cured to form a polyurethane foam. In a polyurethane foam using an inert gas as the foaming functional agent (foaming agent) for the polyurethane reaction composition, the inert gas is included in the cells of the polyurethane foam.

The polyurethane reaction composition contains a polyol component, a foam stabilizer, a catalyst and an isocyanate component, and further, in the present embodiment, contains an acid-modified polyolefin powder. Further, an inert gas is included as a mixed raw material and as a foaming functional agent (foaming agent).

The polyol component may contain, together with a polymer polyol, a polyol other than the polymer polyol.

Examples of the polymer polyol include a polyether polyol to which acrylonitrile, styrene or the like have been graft-polymerized. The polymer polyol preferably has a molecular weight of 2000 to 5000, a functional group number of 2 to 4, and a solid content of 18 to 50% by weight (wt %) of acrylonitrile, styrene or the like in the polymer polyol, with, further, a solid content of 20 to 44% by weight (wt %) being more preferable, and a solid content of 20 to 43% by weight (wt %) being particularly preferable. Two or more kinds of polymer polyol may be used in combination. By including a polymer polyol in the polyol component, favorable strain characteristics (compression set characteristics) can be realized.

The content ratio of the polymer polyol in the polyurethane reaction composition is preferably 3 to 40% by weight. When the content ratio of polymer polyol is low, appropriate hardness cannot be obtained, and conversely, when it is high, the viscosity of the polyurethane reaction composition increases excessively, inhibiting foaming by mechanical frothing. The solid content ratio of the polymer polyol in the polyurethane reaction composition is preferably 1 to 13% by weight. When the solid content ratio of the polymer polyol is low, heat-shaping is inhibited and mold retention is poor, and conversely, when it is high, although heat-shaping is facilitated, the viscosity of the polymer polyol may increase excessively and handling may become more difficult.

As a polyol other than the polymer polyol, known polyols such as polyether polyols and polyester polyols can be used. As the polyether polyol, those having a molecular weight of 300 to 5000 and a functional group number of 2 to 4, and as the polyester polyol, those having a molecular weight of 300 to 3000 and a functional group number of 2 to 4, are preferable. Two or more kinds of polyol other than the polymer polyol may be used in combination.

As the foam stabilizer, those known for use with polyurethane foam can be used. Examples include a silicone-based foam stabilizer (a silicone-based surfactant), a fluorine-based foam stabilizer (a fluorine-based surfactant), and known surfactants. The amount of the foam stabilizer is determined as appropriate, and for example, may be 1.0 to 6.0 parts by weight per 100 parts by weight of the polyol component.

As the catalyst, an amine-based catalyst for polyurethane foam and an organometallic catalyst are used singly or in combination. Examples of the amine-based catalyst include monoamine compounds, diamine compounds, triamine compounds, polyamine compounds, cyclic amine compounds, alcohol amine compounds, and etheramine compounds, and one of these may be used, or two or more kinds may be used in combination. Examples of the organometallic catalyst include organic tin compounds, organic iron compounds, organic bismuth compounds, organic lead compounds, and organic zinc compounds, and one of these may be used singly, or two or more kinds may be used in combination. The amount of the catalyst is determined as appropriate, and for example, may be 0.01 to 3.0 parts by weight per 100 parts by weight of the polyol component.

The isocyanate component may be any of aromatic, alicyclic, and aliphatic isocyanates, and further, even a bifunctional isocyanate having two isocyanate groups in one molecule may be used, or even a tri- or higher-functional isocyanate having three or more isocyanate groups in one molecule may be used, and these may be used singly or in combination of two or more.

Examples of the bifunctional isocyanate include aromatic isocyanates such as 2,4-tolylene diisocyanate (TDI), 2,6-tolylene diisocyanate (TDI), m-phenylene diisocyanate, p-phenylene diisocyanate, 4,4'-diphenylmethane diisocyanate (MDI), 2,4'-diphenylmethane diisocyanate (MDI), 2,2'-diphenylmethane diisocyanate (MDI), xylylene diisocyanate, 3,3'-dimethyl-4,4'-biphenylene diisocyanate, and 3,3'-dimethoxy-4,4'-biphenylene diisocyanate; alicyclic isocyanates such as cyclohexane-1,4-diisocyanate, isophorone diisocyanate, dicyclohexylmethane-4,4'-diisocyanate, and methylcyclohexane diisocyanate; and aliphatic isocyanates such as butane-1,4-diisocyanate, hexamethylene diisocyanate, isopropylene diisocyanate, methylene diisocyanate, and lysine isocyanate.

Further, examples of a bi- or higher-functional functional isocyanate include polymethylene polyphenyl isocyanate (polymeric MDI). Examples of the tri- or higher-functional isocyanate include 1-methylbenzol-2,4,6-triisocyanate, 1,3,5-trimethylbenzol-2,4,6-triisocyanate, biphenyl-2,4,4'-triisocyanate, diphenylmethane-2,4,4'-triisocyanate, methyldiphenylmethane-4,6,4'-triisocyanate, 4,4'-dimethyldiphenylmethane-2,2', 5,5'tetraisocyanate, and triphenylmethane-4,4',4"-triisocyanate. Further, the respective isocyanates are not limited to one type, and may be one or more types. For example, one type of aliphatic isocyanate and two types of aromatic isocyanate may be used in combination. The isocyanate index is preferably from 90 to 110. The isocyanate index is a value obtained by multiplying, by 100, the number of moles of an isocyanate group relative to 1 mol of an active hydrogen group contained in a urethane raw material, and is calculated by: [(isocyanate equivalent in foam raw material/active hydrogen equivalent in foam raw material)×100].

Examples of the acid-modified polyolefin powder include a powder of polyethylene (PE), polypropylene (PP), polybutene (PB), polypentene, ethylene/propylene copolymer, ethylene/vinyl acetate copolymer, styrene/ethylene-butene/styrene copolymer (SEBS), or the like that has been modified with unsaturated carboxylic acid or an acid of an anhydride thereof.

Among the acid-modified polyolefins, acid-modified polyolefins modified with maleic anhydride are preferable. Examples of an acid-modified polyolefin modified with maleic anhydride include maleic anhydride-modified polyethylene, maleic anhydride-modified polypropylene, and maleic anhydride-modified ethylene/propylene copolymer. Maleic anhydride-modified polypropylene includes polypropylene, which is a random copolymer of ethylene, that has been modified by a maleic anhydride, and maleic anhydride-modified ethylene/propylene copolymer includes polypropylene, which is a block copolymer obtained by copolymerizing ethylene and propylene, that has been modified by a maleic anhydride. In particular, maleic anhydride-modified polyethylene and maleic anhydride-modified polypropylene are preferable because they have better mold retention than other acid-modified polyolefins. The acid-modified polyolefin powder is not limited to one type, and may contain plural types. The powder has a particle size of 5 to 250 μm. The melting point of the acid-modified polyolefin may be 80 to 165° C., and is preferably 90 to 140° C.

By including an acid-modified polyolefin powder in the polyurethane reaction composition together with the polymer polyol, it becomes possible to preheat the polyurethane foam to a higher temperature than the melting point of the acid-modified polyolefin powder, and to thermoplasticly deform the polyurethane foam (thermal compression molding) below the decomposition temperature of a urethane bond, and the strain characteristics (compression set characteristics) become favorable.

Further, the content of the acid-modified polyolefin powder in the polyurethane reaction composition is preferably 3 to 35% by weight. When the content of the acid-modified polyolefin powder is low, it becomes impossible to heat-shape, and conversely, when it is high, due to the increase in viscosity, foaming by mechanical frothing becomes impossible.

The ratio of the total weight (total resin amount) of the solid content of the polymer polyol and the acid-modified polyolefin powder relative to the weight of the polyurethane reaction composition is preferably 4 to 40% by weight, and 10 to 40% by weight is more preferable. When the total weight (total resin amount) of the solid content of the polymer polyol and the acid-modified polyolefin powder becomes low, it becomes impossible to heat-shape, and mold retention also decreases. Conversely, when the total amount of resin is large, the viscosity of the polyurethane reaction composition increases excessively, and foaming by mechanical frothing becomes impossible.

In addition, given additives may be added to the polyurethane reaction composition. Examples of the additive include a cross-linking agent, a filler, a dye, a pigment, an antioxidant, and a flame retardant.

Examples of the cross-linking agent include ethylene glycol, diethylene glycol, propylene glycol, dipropylene glycol, 1,4-butanediol, and 1,6-hexanediol.

Examples of the filler include alumina trihydrate, silica, talc, calcium carbonate, and clay.

As an inert gas used as a foaming functional agent (foaming agent), gases that do not adversely affect the reaction or the like between the polyol and the isocyanate, such as dry air or nitrogen, are suitable. The inert gas is preferably mixed in at a mixing ratio in the polyurethane reaction composition of 31% by volume to 91% by volume. The mixing ratio of the inert gas means the percentage by volume of the foaming gas with respect to 100 parts by volume of the polyurethane reaction composition excluding the inert gas.

The polyurethane foam of the present embodiment has residual compression strain (JIS K 6401: 2011) of 10% or less, and little plastic deformation is caused by long-term use.

Further, the polyurethane foam of the present embodiment has a 25% compressive load (25% CLD, JIS K 6254: 2010, compressive stress when a φ50 mm sample is compressed by 25% at a rate of 1 mm/min) of preferably 0.01 to 0.1 MPa.

The molded body of the polyurethane foam of the present embodiment is manufactured by shaping irregularities by thermal compression molding including preheating of the polyurethane foam and compression pressing using a die at ambient temperature. Thermal compression molding is performed by preheating the polyurethane foam at 160-210° C., and more preferably 190-210° C., and compression pressing with a die at ambient temperature (20 to 35° C.). The preheating time is preferably 3 to 10 minutes. The mold surface of the mold is provided with irregularities in accordance with the intended use of the molded product, and irregularities are formed on the surface of the molded body. The compression ratio at the time of compression pressing is preferably 25 to 75%. The compression ratio is calculated by: compression ratio=[(original thickness-thickness at time of compression)/original thickness×100].

An example of a molded body of polyurethane foam is shown in FIGS. 1 and 2. The polyurethane foam molded body 10 shown in FIGS. 1 and 2 is formed by a sheet of the polyurethane foam of the present embodiment having a predetermined thickness being preheated at 200° C. for 5 minutes and the preheated sheet being compression-pressed at ambient temperature (25° C.) to form irregularities, and is used as an insole. The polyurethane foam molded body 10 has concave portions 101, 103 and convex portions 102, 104, 106 formed at regions corresponding to the vicinity of the base of the toes, the arch portion, and the heel portion. Reference numeral 107 indicates a general portion 107 having no irregularity.

In the polyurethane foam molded body 10 having irregularities shaped by thermal compression molding, since the polyurethane foam of the present embodiment when used has favorable strain characteristics (compression set characteristics), the irregular shape is less likely to be plastically deformed even by pressing owing to long-term use, and favorable quality can be maintained.

EXAMPLES

Using the raw materials described below, in the polyurethane reaction composition consisting of the formulations shown in FIGS. 3 and 4, the mixing ratio of the inert gas (nitrogen) was set at 85% by volume, mixing and stirring was performed with a mechanical froth foamer, the resultant was continuously ejected onto release paper and heated to 120-200° C., and a sheet-shaped polyurethane foam having a thickness of 10 mm was produced.

Crosslinking agent: dipropylene glycol, molecular weight: 134, number of functional groups: 2, solid content: 0% by weight Polyol A: polyether polyol, product name: PP-400, manufactured by Sanyo Chemical Industries, Ltd., molecular weight: 400, number of functional groups: 2, solid content: 0% by weight Polyol 1: polyether polyol, product name: PP-3000, manufactured by Sanyo Chemical Industries, Ltd., molecular weight: 3000, number of functional groups: 3, propylene oxide content: 100%, solid content: 0% by weight Polyol 2: polymer polyol, product name: EX-914, manufactured by Asahi Glass Co., Ltd., molecular weight: 3000, number of functional groups: 3, solid content ratio: 22.9% by weight Polyol 3: polymer polyol, product name: EX-913, manufactured by Asahi Glass Co., Ltd., molecular weight: 3000, number of functional groups: 2, solid content ratio: 20% by weight Polyol 4: polymer polyol, product name: FS-7301, manufactured by Sanyo Chemical Industries, Ltd., molecular weight: 3000, number of functional groups: 3, solid content ratio: 43% by weight Polyol 5: polymer polyol, product name: EX-941WF, manufactured by Asahi Glass Co., Ltd., molecular weight: 3000, number of functional groups: 3, solid content ratio: 40% by weight Ordinary polyethylene (PE) powder: 1050, melting point=105° C., average particle size: 30-45 μm, manufactured by Tokyo Ink Co., Ltd.

Polyamide resin powder: SK-1, melting point=115° C., manufactured by Tokyo Ink Co., Ltd.

Polyester resin powder: G-120, melting point=125° C., manufactured by Tokyo Ink Co., Ltd.

Acid-modified polyethylene (PE) powder: maleic anhydride-modified polyethylene, product name: Admer AT1000, melting point=123° C., average particle size: 100-160 μm, manufactured by Mitsui Chemicals, Inc.

Acid-modified polypropylene (PP) powder: maleic anhydride-modified polypropylene, product name: Umex 1010, melting point=135° C., average particle size: 100-150 μm, manufactured by Sanyo Chemical Industries, Ltd.

Silicone foam stabilizer: product name: SZ-1952, manufactured by Dow Toray Co., Ltd.

Iron catalyst: product name: FIN-P1, manufactured by Nihon Kagaku Sangyo Co., Ltd., 0.25% by weight of iron acetylacetonate, 99.75% by weight of polyether polyol Alumina trihydrate: product name: C-31, manufactured by Sumitomo Chemical Co., Ltd.

Isocyanate: product name: MSS, manufactured by BASF INOAC Polyurethanes Ltd., Polymeric MDI (Crude MDI), NCO %: 34%

In addition, since ordinary polyethylene (PE) powder, polyamide resin powder, polyester resin powder, acid-modified polyethylene (PE) powder and acid-modified polypropylene (PP) powder are each thermoplastic resin powders, the term "thermoplastic resin powder" is shown in FIGS. 3 and 4 as a category in which these are included.

The "wt %" in FIGS. 3 and 4 indicates a percentage by weight in the polyurethane reaction composition. Further, the total resin ratio (wt %) is a percentage by weight of the total amount of the solid content of the thermoplastic resin powder and the polymer polyol in the polyurethane reaction composition relative to the total amount of the polyurethane reaction composition.

The foamed state of each example and each comparative example was visually determined. The evaluation was "Double circle" in a favorable case in which there was no bubble rupture or the like, and "x" in a case in which there was a portion having a defect such as bubble rupture.

Further, regarding each example and each comparative example, thermal compression molding was performed and the initial moldability, the mold retention after 24 hours at ambient temperature (25° C.) (ambient temperature×24 hours), and the mold retention after 1 week at ambient temperature (ambient temperature×1 week) were measured.

Thermal compression molding was performed by preheating a polyurethane foam sheet with a thickness (original thickness) of 10 mm at 200° C. for 5 minutes, then compressing to a thickness of 5 mm (compression ratio 50%) with a press device at ambient temperature, and maintaining this state for 5 minutes. At the time of pressing, spacers having a thickness of 5 mm were placed on both sides of the polyurethane foam sheet and pressing performed, as a result of which the press amount was adjusted to 5 mm.

Initial moldability (%) was the mold retention rate immediately after molding in which the compressed state had been maintained for 5 minutes, as calculated by: [(original thickness−thickness immediately after molding)/(original thickness−thickness of spacer)×100].

Mold retention (ambient temperature×24 h (%)) was the mold retention after being left at ambient temperature for 24 hours after molding, as calculated by: [(original thickness−thickness 24 hours later)/(original thickness−thickness immediately after molding)×100].

Mold retention (ambient temperature×1 week (%)) was the mold retention rate after being left at ambient temperature for 1 week after molding, as calculated by: [(original thickness−thickness after 1 week)/(original thickness−thickness immediately after molding)×100].

As regards evaluation of initial moldability and mold retention, when the molding retention rate was less than 50%, the evaluation was "x", when it was 50% to less than 70%, the evaluation was "Triangle", when it was 70% to less than 90%, the evaluation was "Single circle", and when it was 90% to 100%, the evaluation was "Double circle".

In addition, 25% CLD and residual compression strain (compression set) were measured for each example and each comparative example.

25% CLD (MPa), based on JIS K 6254: 2010, is the compressive stress when a φ50 mm sample is compressed by 25% at a speed of 1 mm/min.

For the residual compression strain (compression set) (%), based on JIS K6401: 2011, a 50×50 mm sample was compressed by 50% in the thickness direction, this was left to stand for 22 hours at a predetermined temperature (70° C.), after this, the compressive stress was relieved at ambient temperature, the thickness of the sample after 30 minutes had passed (thickness after release) was measured, and a value was calculated using the following formula.

$$\text{Residual compression strain (compression set)(\%)}= \text{[(thickness before compression thickness after release)/thickness before compression×100]}$$

As regards evaluation of residual compression strain, when the value of the residual compression strain was 5% or less, the evaluation was "Double circle", when it exceeded 5% but was 10% or less, the evaluation was "Single circle", and when it exceeded 10%, the evaluation was "x".

Overall evaluation was performed in accordance with the results of each test category. For the overall evaluation, the lowest evaluation among the evaluations of each test category was taken as the overall evaluation. For example, even if there was only one "x" among the evaluations of the test categories, the overall evaluation was "x", and when all the evaluations of the test categories were "Triangle" or higher ("Triangle", "Single circle", "Double circle") but even only one was "Triangle", the overall evaluation was "Triangle". If all the test category evaluations were "Single circle" or higher ("Single circle", "Double circle") but there was even only one "Single circle", the overall evaluation was "Single circle". When all the evaluations of the test categories were "Double circle", the overall evaluation was "Double circle".

Comparative Example 1 is an example that contained a polymer polyol as a polyol component and in which ordinary polyethylene powder was added as a thermoplastic resin powder. Since the result of Comparative Example 1 was that there was bubble rupture in the foamed state, no other tests were performed. The overall evaluation is "x".

Comparative Example 2 is an example that did not contain a polymer polyol as a polyol component and in which a thermoplastic resin powder was not added. In Comparative Example 2, the foamed state was "Double circle", the initial moldability was 10.6%: evaluation "x", the mold retention (ambient temperature×24 h) was 90.5%: evaluation "Double circle", the mold retention (ambient temperature×1 week) was 66.7%: evaluation "Triangle", 25% CLD was 0.015 MPa and the residual compression strain was 2.8%: evaluation "Double circle", and since the initial moldability was poor, the overall evaluation is "x".

Comparative Example 3 is an example that contained a polymer polyol as a polyol component, and in which a thermoplastic resin powder was not added, the polymer polyol solid content ratio in the polyurethane reaction composition was 5.0 wt %, and the total resin ratio was 5.0 wt %. In Comparative Example 3, the foamed state was "Double circle", the initial moldability was 20.5%: evaluation "x", the mold retention (ambient temperature×24 h) was 93.5%: evaluation "Double circle", the mold retention (ambient temperature×1 week) was 41.9%: evaluation "x", 25% CLD was 0.050 MPa and the residual compression strain was 2.7%: evaluation "Double circle", and since the initial moldability and mold retention (ambient temperature×1 week) were poor, the overall evaluation is "x".

Comparative Example 4 is an example that contained a polymer polyol as a polyol component, and in which a thermoplastic resin powder was not added, the polymer polyol solid content ratio in the polyurethane reaction composition was 7.7 wt %, and the total resin ratio was 7.7 wt %. In Comparative Example 4, the foamed state was "Double circle", the initial moldability was 35.1%: evaluation "x", the mold retention (ambient temperature×24 h) was 91.7%: evaluation "Double circle", the mold retention (ambient temperature×1 week) was 64.3%: evaluation "Triangle", 25% CLD was 0.053 MPa and the residual compression strain was 2.5%: evaluation "Double circle", and since the initial moldability was poor, the overall evaluation is "x".

Comparative Example 5 is an example that did not contain a polymer polyol as a polyol component, and in which 27.2 wt % of ordinary polyethylene powder was added as a thermoplastic resin powder and the total resin ratio was 27.2 wt %. In Comparative Example 5, the foamed state was "Double circle", the initial moldability was 28.2%: evaluation "x", the mold retention (ambient temperature×24 h) was 82.5%: evaluation "Single circle", the mold retention (ambient temperature×1 week) was 38.6%: evaluation "x", 25% CLD was 0.028 MPa and the residual compression strain was 2.1%: evaluation "Double circle", and since the initial moldability and mold retention (ambient temperature×1 week) were poor, the overall evaluation is "x".

Comparative Example 6 is an example that contained a polymer polyol as a polyol component, and in which polyamide resin powder was added as a thermoplastic resin powder, the polymer polyol solid content ratio in the polyurethane reaction composition was 13.0 wt %, the addition ratio of the polyamide resin powder was 13.3 wt %, and the total resin ratio was 26.3 wt %. In Comparative Example 6, the foamed state was "Double circle", the initial moldability was 31.8%: evaluation "x", the mold retention (ambient temperature×24 h) was 78.8%: evaluation "Single circle", the mold retention (ambient temperature×1 week) was 69.5%: evaluation "Triangle", 25% CLD was 0.103 MPa and the residual compression strain was 37.5%: evaluation "x", and since the initial moldability and residual compression strain were poor, the overall evaluation is "x".

Comparative Example 7 is the same example as Comparative Example 6 except that the polyester resin powder was used as the thermoplastic resin powder. In Comparative Example 7, the foamed state was "Double circle", the initial moldability was 30.4%: evaluation "x", the mold retention (ambient temperature×24 h) was 78.2%: evaluation "Single circle", the mold retention (ambient temperature×1 week) was 69.4%: evaluation "Triangle", 25% CLD was 0.048 MPa and the residual compression strain was 18.8%: evaluation "x", and since the initial moldability and residual compression strain were poor, the overall evaluation is "x".

In Example 1, 5 parts by weight of polyol 4 (POP, solid content ratio: 43 wt %) were added as a polymer polyol to a total of 65.9 parts by weight of a cross-linking agent and a polyol component, 5 parts by weight of acid-modified polyethylene powder were added as a thermoplastic resin powder, the polymer polyol content ratio in the polyurethane reaction composition was 3.3 wt %, the solid content ratio of the polymer polyol was 1.4 wt %, the addition ratio of the acid-modified polyethylene powder in the polyurethane reaction composition was 3.3 wt %, and the total resin ratio was 4.7 wt %. In Example 1, the foamed state was "Double circle", the initial moldability was 63.5%: evaluation "Triangle", the mold retention (ambient temperature×24 h) was 71%: evaluation "Single circle", the mold retention (ambient temperature×1 week) was 60.3%: evaluation "Triangle", 25% CLD was 0.691 MPa and the residual compression strain was 3.7%: evaluation "Double circle", and the overall evaluation is "Triangle". In Example 1, there was no "x" in any of the evaluation results and since the initial moldability, mold retention and residual compression strain were all favorable, thermal compression molding is possible, and strain characteristics are favorable.

In Example 2, 20 parts by weight of polyol 4 (POP, solid content ratio: 43 wt %) were added as a polymer polyol to a total of 65.9 parts by weight of a cross-linking agent and a polyol component, the polymer polyol content ratio in the polyurethane reaction composition was 13.2 wt %, the solid content ratio of the polymer polyol was 5.7 wt %, the addition ratio of the acid-modified polyethylene powder in the polyurethane reaction composition was 3.3 wt %, and the total resin ratio was 9.0 wt %. In Example 2, the foamed state was "Double circle", the initial moldability was 97.9%: evaluation "Double circle", the mold retention (ambient temperature×24 h) was 91.3%: evaluation "Double circle", the mold retention (ambient temperature×1 week) was 84.8%: evaluation "Single circle", 25% CLD was 0.715 MPa and the residual compression strain was 3.3%: evaluation "Double circle", and the overall evaluation is "Single circle". In Example 2, all evaluations were "Single circle" or higher, and since the initial moldability, mold retention and residual compression strain were all favorable, thermal compression molding is possible, and strain characteristics are favorable.

In Example 3, 40 parts by weight of polyol 4 (POP, solid content ratio: 43 wt %) were added as a polymer polyol to a total of 65.9 parts by weight of a cross-linking agent and a polyol component, 10 parts by weight of acid-modified polyethylene powder were added, the polymer polyol content ratio in the polyurethane reaction composition was 26.6 wt %, the solid content ratio of the polymer polyol was 11.4 wt %, the addition ratio of the acid-modified polyethylene powder in the polyurethane reaction composition was 6.6 wt %, and the total resin ratio was 18.0 wt %. In Example 3, the foamed state was "Double circle", the initial moldability was 95.4%: evaluation "Double circle", the mold retention (ambient temperature×24 h) was 92.2%: evaluation "Double circle", the mold retention (ambient temperature×1 week) was 88.5%: evaluation "Single circle", 25% CLD was 1.073 MPa and the residual compression strain was 3.7%: evaluation "Double circle", and the overall evaluation is "Single circle". In Example 3, all evaluations were "Single circle" or higher, and since the initial moldability, mold retention and residual compression strain were all favorable, thermal compression molding is possible, and strain characteristics are favorable.

In Example 4, 30 parts by weight of polyol 4 (POP, solid content ratio: 43 wt %) were added as a polymer polyol to a total of 65.9 parts by weight of a cross-linking agent and a polyol component, 30 parts by weight of acid-modified polyethylene powder were added, the polymer polyol content ratio in the polyurethane reaction composition was 19.8 wt %, the solid content ratio of the polymer polyol was 8.5 wt %, the addition ratio of the acid-modified polyethylene powder in the polyurethane reaction composition was 19.8 wt %, and the total resin ratio was 28.3 wt %. In Example 4, the foamed state was "Double circle", the initial moldability was 97.0%: evaluation "Double circle", the mold retention (ambient temperature×24 h) was 96.8%: evaluation "Double circle", the mold retention (ambient temperature×1 week) was 95.2%: evaluation "Double circle", 25% CLD was 0.669 MPa and the residual compression strain was 3.1%: evaluation "Double circle", and the overall evaluation is "Double circle". In Example 4, all evaluations were "Double circle", and since the initial moldability, mold retention and residual compression strain were all favorable, thermal compression molding is possible, and strain characteristics are favorable.

In Example 5, the value of the total resin ratio was set to 29.0 wt %, which is almost the same as the 28.3 wt % in Example 4, and the ratio of the polymer polyol and the acid-modified polyethylene powder was changed. In Example 5, 10 parts by weight of polyol 4 (POP, solid content ratio: 43 wt %) were added as a polymer polyol to a total of 65.9 parts by weight of a cross-linking agent and a polyol component, 40 parts by weight of acid-modified polyethylene powder were added, the polymer polyol content ratio in the polyurethane reaction composition was 6.6 wt %, the solid content ratio of the polymer polyol was 2.8 wt %, the addition ratio of the acid-modified polyethylene powder in the polyurethane reaction composition was 26.2 wt %, and the total resin ratio was 29.0 wt %. In Example 5, the foamed state was "Double circle", the initial moldability was 97.1%: evaluation "Double circle", the mold retention (ambient temperature×24 h) was 98.1%: evaluation "Double circle", the mold retention (ambient temperature×1 week) was 97.2%: evaluation "Double circle", 25% CLD was 0.550 MPa and the residual compression strain was 3.6%: evaluation "Double circle", and the overall evaluation is "Double circle". In Example 5, all evaluations were "Double circle", and since the initial moldability, mold retention and residual compression strain were all favorable, thermal compression molding is possible, and strain characteristics are favorable.

In Example 6, the acid-modified polyethylene powder was increased to 50 parts by weight, the content ratio of the polymer polyol (polyol 4, solid content ratio 43 wt %) in the polyurethane reaction composition was 6.3 wt %, the solid content ratio of the polymer polyol was 2.7 wt %, the addition ratio of the acid-modified polyethylene powder in the polyurethane reaction composition was 31.3 wt %, and the total resin ratio was 34.0 wt %. In Example 6, the foamed state was "Double circle", the initial moldability was 97.7%: evaluation "Double circle", the mold retention (ambient temperature×24 h) was 98.8%: evaluation "Double circle", the mold retention (ambient temperature×1 week) was 97.9%: evaluation "Double circle", 25% CLD was 0.405 MPa and the residual compression strain was 4.6%: evaluation "Double circle", and the overall evaluation is "Double circle". In Example 6, all evaluations were "Double circle", and since the initial moldability, mold retention and residual compression strain were all favorable, thermal compression molding is possible, and strain characteristics are favorable.

Example 7 was the same as Example 3 except that acid-modified polypropylene was added instead of acid-modified polyethylene, the content ratio of the polymer polyol (polyol 4, solid content ratio 43 wt %) in the polyurethane reaction composition was 26.6 wt %, the solid content ratio of the polymer polyol was 11.4 wt %, the addition ratio of the acid-modified polypropylene powder in the polyurethane reaction composition was 6.6 wt %, and the total resin ratio was 18.0 wt %. In Example 7, the foamed state was "Double circle", the initial moldability was 94.2%: evaluation "Double circle", the mold retention (ambient temperature×24 h) was 91.5%: evaluation "Double circle", the mold retention (ambient temperature×1 week) was 87.2%: evaluation "Single circle", 25% CLD was 1.082 MPa and the residual compression strain was 3.8%: evaluation "Double circle", and the overall evaluation is "Single circle". In Example 7, all evaluations were "Single circle" or higher, and since the initial moldability, mold retention and residual compression strain were all favorable, thermal compression molding is possible, and strain characteristics are favorable.

In Example 8, 30 parts by weight of polyol 3 (POP, solid content ratio: 20 wt %) were added as a polymer polyol to a total of 65.9 parts by weight of a cross-linking agent and a polyol component, 30 parts by weight of acid-modified polyethylene powder were added as a thermoplastic resin powder, the polymer polyol content ratio in the polyurethane reaction composition was 19.8 wt %, the solid content ratio of the polymer polyol was 4.0 wt %, the addition ratio of the acid-modified polyethylene powder in the polyurethane reaction composition was 19.8 wt %, and the total resin ratio was 23.8 wt %. In Example 8, the foamed state was "Double circle", the initial moldability was 89.8%: evaluation "Single circle", the mold retention (ambient temperature×24 h) was 75.4%: evaluation "Single circle", the mold retention (ambient temperature×1 week) was 73.6%: evaluation "Single circle", 25% CLD was 0.187 MPa and the residual compression strain was 4.8%: evaluation "Double circle", and the overall evaluation is "Single circle". In Example 8, all evaluations were "Single circle" or higher, and since the initial moldability, mold retention and residual compression strain were all favorable, thermal compression molding is possible, and strain characteristics are favorable.

In Example 9, 40 parts by weight of polyol 3 (POP, solid content ratio: 20 wt %) were added as a polymer polyol to a total of 65.9 parts by weight of a cross-linking agent and a polyol component, the polymer polyol content ratio in the polyurethane reaction composition was 26.6 wt %, the solid content ratio of the polymer polyol was 5.3 wt %, the addition ratio of the acid-modified polyethylene powder in the polyurethane reaction composition was 19.9 wt %, and the total resin ratio was 25.2 wt %. In Example 9, the foamed state was "Double circle", the initial moldability was 89.6%: evaluation "Single circle", the mold retention (ambient temperature×24 h) was 81.2%: evaluation "Single circle", the mold retention (ambient temperature×1 week) was 80.8%: evaluation "Single circle", 25% CLD was 0.212 MPa and the residual compression strain was 4.5%: evaluation "Double circle", and the overall evaluation is "Single circle". In Example 9, all evaluations were "Single circle" or higher, and since the initial moldability, mold retention and residual compression strain were all favorable, thermal compression molding is possible, and strain characteristics are favorable.

In Example 10, the addition amount of acid-modified polyethylene powder was set at 40 parts by weight, the content ratio of the polymer polyol (polyol 3, solid content ratio 20 wt %) in the polyurethane reaction composition was 18.6 wt %, the solid content ratio of the polymer polyol was 3.7 wt %, the addition ratio of the acid-modified polyethylene powder in the polyurethane reaction composition was 24.8 wt %, and the total resin ratio was 28.5 wt %. In Example 10, the foamed state was "Double circle", the initial moldability was 96.2%: evaluation "Double circle", the mold retention (ambient temperature×24 h) was 90.1%: evaluation "Double circle", the mold retention (ambient temperature×1 week) was 88.9%: evaluation "Single circle", 25% CLD was 0.183 MPa and the residual compression strain was 5.5%: evaluation "Single circle", and the overall evaluation is "Single circle". In Example 10, all evaluations were "Single circle" or higher, and since the initial moldability, mold retention and residual compression strain were all favorable, thermal compression molding is possible, and strain characteristics are favorable.

In Example 11, the addition amount of acid-modified polyethylene powder was set at 40 parts by weight, the content ratio of the polymer polyol (polyol 3, solid content ratio 20 wt %) in the polyurethane reaction composition was 24.9 wt %, the solid content ratio of the polymer polyol (polyol 3, solid content ratio 20 wt %) was 5.0 wt %, the addition ratio of the acid-modified polyethylene powder in the polyurethane reaction composition was 24.9 wt %, and the total resin ratio was 29.9 wt %. In Example 11, the foamed state was "Double circle", the initial moldability was 90.2%: evaluation "Double circle", the mold retention (ambient temperature×24 h) was 87.5%: evaluation "Single circle", the mold retention (ambient temperature×1 week) was 86.1%: evaluation "Single circle", 25% CLD was 0.240 MPa and the residual compression strain was 3.3%: evaluation "Double circle", and the overall evaluation is "Single circle". In Example 11, all evaluations were "Single circle" or higher, and since the initial moldability, mold retention and residual compression strain were all favorable, thermal compression molding is possible, and strain characteristics are favorable.

In Example 12, 30 parts by weight of polyol 5 (POP, solid content ratio: 40 wt %) were added as a polymer polyol to a total of 65.9 parts by weight of a cross-linking agent and a polyol component, 30 parts by weight of acid-modified polyethylene powder were added as a thermoplastic resin powder, the polymer polyol content ratio in the polyurethane reaction composition was 19.8 wt %, the solid content ratio of the polymer polyol was 7.9 wt %, the addition ratio of the acid-modified polyethylene powder in the polyurethane reaction composition was 19.8 wt %, and the total resin ratio was 27.7 wt %. In Example 12, the foamed state was "Double circle", the initial moldability was 97.6%: evaluation "Double circle", the mold retention (ambient temperature×24 h) was 91.5%: evaluation "Double circle", the mold retention (ambient temperature×1 week) was 82.6%: evaluation "Single circle", 25% CLD was 0.139 MPa and the residual compression strain was 5.7%: evaluation "Single circle", and the overall evaluation is "Single circle". In Example 12, all evaluations were "Single circle" or higher, and since the initial moldability, mold retention and residual compression strain were all favorable, thermal compression molding is possible, and strain characteristics are favorable.

In addition, in order to confirm the effect of the preheating temperature on the surface condition of the molded body and the mold retention (moldability), using the polyurethane foam of Example 4, thermal compression molding was performed by changing the preheating temperature and preheating time, and the surface condition after preheating and the molding retention after thermal compression molding were evaluated. The results of each example and each comparative example are shown in FIG. 5. In the results shown in FIG. 5, examples in the preheating temperature range of the thermal compression molding are taken as the examples, and examples deviating therefrom were used as the comparative examples. The thermal compression molding was performed as follows. First, a sheet of polyurethane foam with a thickness (original thickness) of 10 mm was preheated at the preheating temperature and the preheating time of each example and each comparative example. Then, spacers with a thickness of 5 mm were placed on both sides of the polyurethane foam sheet, the sheet was compressed to a thickness of 5 mm (compression rate: 50%) by a pressing device at ambient temperature (25° C.), and this state was maintained for 5 minutes.

Evaluation of the surface condition was performed by visually observing the surface of the polyurethane foam after preheating, and the evaluation was "x" if the surface was burnt or rough, and when there was no surface burning or surface roughness and the surface condition was smooth, the evaluation was "Double circle".

For mold retention, the thickness of the molded body was measured at the respective timings of immediately after thermal compression molding, one day later, and one week later, and the mold retention (%) was calculated by the following formula, and if the calculated mold retention (%) was less than 50%, the evaluation was "x", if it was 50% to less than 70%, "Triangle", if it was 70% to less than 90%, "Single circle", and in the case of 90% to 100%, "Double circle".

$$\text{Mold retention (\%)} = (\text{original thickness} - \text{thickness at the time of measurement})/(\text{original thickness} - \text{thickness of spacer}) \times 100$$

Example 4-1 is an example in which the preheating temperature was 190° C. and the preheating time was 3 minutes, the surface condition was "Double circle", mold retention immediately after molding was "Double circle", mold retention after 1 day was "Single circle", and mold retention after 1 week was "Single circle", and both the surface condition and the mold retention (moldability) were favorable.

Example 4-2 is an example in which the preheating temperature was 200° C. and the preheating time was 3 minutes, the surface condition was "Double circle", mold retention immediately after molding was "Double circle", mold retention after 1 day was "Single circle", and mold retention after 1 week was "Single circle", and both the surface condition and the mold retention (moldability) were favorable.

Example 4-3 is an example in which the preheating temperature was 210° C. and the preheating time was 3 minutes, the surface condition was "Double circle", mold retention immediately after molding was "Double circle", mold retention after 1 day was "Double circle", and mold retention after 1 week was "Double circle", and both the surface condition and the mold retention (moldability) were optimal.

Comparative Example 4-1 is an example in which the preheating temperature was 220° C. and the preheating time was 3 minutes, the surface condition was "x", mold retention immediately after molding was "Double circle", mold retention after 1 day was "Double circle", and mold retention after 1 week was "Double circle", and because the preheating temperature was too high, the surface condition was poor.

Comparative Example 4-2 is an example in which the preheating temperature was 150° C. and the preheating time was 4 minutes, the surface condition was "Double circle", mold retention immediately after molding was "Double circle", mold retention after 1 day was "Triangle", and mold retention after 1 week was "Triangle", and because the preheating temperature was too low, the mold retention (moldability) was poor.

Example 4-4 is an example in which the preheating temperature was 160° C. and the preheating time was 4 minutes, the surface condition was "Double circle", mold retention immediately after molding was "Double circle", mold retention after 1 day was "Single circle", and mold retention after 1 week was "Single circle", and both the surface condition and the mold retention (moldability) were favorable.

Example 4-5 is an example in which the preheating temperature was 170° C. and the preheating time was 4 minutes, the surface condition was "Double circle", mold retention immediately after molding was "Double circle", mold retention after 1 day was "Single circle", and mold retention after 1 week was "Single circle", and both the surface condition and the mold retention (moldability) were favorable.

Example 4-6 is an example in which the preheating temperature was 180° C. and the preheating time was 4 minutes, the surface condition was "Double circle", mold retention immediately after molding was "Double circle", mold retention after 1 day was "Single circle", and mold retention after 1 week was "Single circle", and both the surface condition and the mold retention (moldability) were favorable.

Example 4-7 is an example in which the preheating temperature was 190° C. and the preheating time was 4 minutes, the surface condition was "Double circle", mold retention immediately after molding was "Double circle", mold retention after 1 day was "Single circle", and mold retention after 1 week was "Single circle", and both the surface condition and the mold retention (moldability) were favorable.

Example 4-8 is an example in which the preheating temperature was 200° C. and the preheating time was 4 minutes, the surface condition was "Double circle", mold retention immediately after molding was "Double circle", mold retention after 1 day was "Double circle", and mold retention after 1 week was "Double circle", and both the surface condition and the mold retention (moldability) were optimal.

Comparative Example 4-3 is an example in which the preheating temperature was 150° C. and the preheating time was 5 minutes, the surface condition was "Double circle", mold retention immediately after molding was "Double circle", mold retention after 1 day was "Triangle", and mold retention after 1 week was "Triangle", and because the preheating temperature was too low, the mold retention (moldability) was poor.

Example 4-9 is an example in which the preheating temperature was 160° C. and the preheating time was 5 minutes, the surface condition was "Double circle", mold retention immediately after molding was "Double circle", mold retention after 1 day was "Single circle", and mold retention after 1 week was "Single circle", and both the surface condition and the mold retention (moldability) were favorable.

Example 4-10 is an example in which the preheating temperature was 170° C. and the preheating time was 5 minutes, the surface condition was "Double circle", mold retention immediately after molding was "Double circle", mold retention after 1 day was "Single circle", and mold retention after 1 week was "Single circle", and both the surface condition and the mold retention (moldability) were favorable.

Example 4-11 is an example in which the preheating temperature was 180° C. and the preheating time was 5 minutes, the surface condition was "Double circle", mold retention immediately after molding was "Double circle", mold retention after 1 day was "Single circle", and mold retention after 1 week was "Single circle", and both the surface condition and the mold retention (moldability) were favorable.

Example 4-12 is an example in which the preheating temperature was 190° C. and the preheating time was 5 minutes, the surface condition was "Double circle", mold retention immediately after molding was "Double circle", mold retention after 1 day was "Double circle", and mold retention after 1 week was "Double circle", and both the surface condition and the mold retention (moldability) were optimal.

Example 4-13 is an example in which the preheating temperature was 200° C. and the preheating time was 5 minutes, the surface condition was "Double circle", mold retention immediately after molding was "Double circle", mold retention after 1 day was "Double circle", and mold retention after 1 week was "Double circle", and both the surface condition and the mold retention (moldability) were optimal.

As described above, the polyurethane foam in the present invention can be subjected to thermal compression and has favorable strain characteristics. Further, the molded body of the polyurethane foam in the present invention has favorable strain characteristics that can maintain the surface irregularities formed by thermal compression molding. Further, the method for producing a polyurethane foam molded body in the present invention can obtain a molded product having favorable strain characteristics, that can maintain the surface irregularities of a sheet shaped by thermal compression molding, that has a favorable flat state with no surface burning or roughness, and that has favorable mold retention (moldability).

Although the present invention has been described in detail with reference to specific embodiments, it will be apparent to those skilled in the art that various changes and modifications can be made without departing from the spirit or scope of the invention.

In addition, the present application is based on a Japanese patent application filed on Oct. 10, 2019 (Japanese Patent Application No. 2019-186657), a Japanese patent application filed on May 29, 2020 (Japanese Patent Application No. 2020-94119), and a Japanese patent application filed on Oct. 9, 2020 (Japanese Patent Application No. 2020-171088), each of which is fully incorporated by reference. Further, all references cited here are incorporated as a whole.

EXPLANATION OF REFERENCE NUMERALS

10 Polyurethane foam molded body
101, 103 Concave portion
102, 104, 106 Convex portion
107 General portion without irregularity
The invention claimed is:

1. A polyurethane foam, obtained from an inert gas and a polyurethane reaction composition containing a polyol component, a foam stabilizer, a catalyst and an isocyanate component, by a mechanical froth method, wherein:
the polyol component contains a polymer polyol having a solid content of from 20% by weight to 43% by weight,
the polymer polyol includes a polyether polyol to which acrylonitrile or styrene has been graft-polymerized,
the polyurethane reaction composition contains a polyolefin powder that has been modified by a maleic anhydride,
a mixing ratio of the inert gas is from 31% by volume to 91% by volume relative to 100 parts by volume of the polyurethane reaction composition excluding the inert gas, and
a residual compression strain of the polyurethane foam based on JIS K6401: 2011 is 10% or lower.

2. The polyurethane foam recited in claim 1,
wherein a proportion of a total weight of the solid content of the polymer polyol and the acid-modified polyolefin powder, relative to a weight of the polyurethane reaction composition, is from 4% by weight to 40% by weight.

3. A molded body of a polyurethane foam, comprising irregularities formed by thermal compression molding at a surface of a sheet of the polyurethane foam, the polyurethane foam comprising the polyurethane foam recited in claim 1.

4. A method for producing a molded body comprising irregularities formed by thermal compression molding at a surface of a sheet of a polyurethane foam, the method comprising:
preheating a sheet comprising the polyurethane foam recited in claim 1 at from 160 to 210° C.;
subjecting the sheet after the preheating to thermal compression molding by compression pressing using an ambient-temperature die provided with irregularities at a mold face; and
imparting the irregularities of the mold face to a surface of the sheet.

5. The method for producing a molded body recited in claim 4,
wherein a compression ratio of the sheet by the compression pressing is from 25 to 75%.

6. A method for producing the polyurethane foam recited in claim 1, the method comprising:
in a mixed raw material obtained by mixing an inert gas with the polyurethane reaction composition, forming bubbles by the inert gas, and in this state, the polyol component and the isocyanate component react and are cured.

7. A polyurethane foam, obtained from an inert gas and a polyurethane reaction composition containing a polyol component, a foam stabilizer, a catalyst and an isocyanate component, by a mechanical froth method, wherein:
the polyol component contains a polymer polyol,
the polymer polyol includes a polyether polyol to which acrylonitrile or styrene has been graft-polymerized, and has a solid content of from 20% by weight to 43% by weight of the graft-polymerized acrylonitrile or styrene in the polymer polyol,
the polyurethane reaction composition contains a polyolefin powder that has been modified by a maleic anhydride, and
a residual compression strain of the polyurethane foam based on JIS K6401: 2011 is 10% or lower.

* * * * *